US009348730B2

(12) United States Patent
Odlivak et al.

(10) Patent No.: US 9,348,730 B2
(45) Date of Patent: May 24, 2016

(54) FIRMWARE ROM PATCH METHOD

(75) Inventors: Andrew J. Odlivak, Oakdale, NY (US); Ravindra Kumar, Holbrook, NY (US); Warren R. Stearns, Sioux Falls, SD (US); John Glen Rockford, Wading River, NY (US)

(73) Assignee: STANDARD MICROSYSTEMS CORPORATION, Hauppauge, NY (US)

( * ) Notice: Subject to any disclaimer, the term of this patent is extended or adjusted under 35 U.S.C. 154(b) by 2051 days.

(21) Appl. No.: 11/669,776

(22) Filed: Jan. 31, 2007

(65) Prior Publication Data

US 2008/0184072 A1  Jul. 31, 2008

(51) Int. Cl.
G06F 9/44 (2006.01)
G06F 11/36 (2006.01)

(52) U.S. Cl.
CPC ........ *G06F 11/3644* (2013.01); *G06F 11/3648* (2013.01)

(58) Field of Classification Search
None
See application file for complete search history.

(56) References Cited

U.S. PATENT DOCUMENTS

| | | | | |
|---|---|---|---|---|
| 5,579,522 A * | 11/1996 | Christeson et al. | | 713/2 |
| 5,590,069 A | 12/1996 | Levin | | |
| 5,726,641 A * | 3/1998 | Ide | | 340/7.39 |
| 5,748,940 A | 5/1998 | Angelo et al. | | |
| 5,901,225 A * | 5/1999 | Ireton et al. | | 714/6.32 |
| 5,907,167 A | 5/1999 | Levin | | |
| 6,009,497 A * | 12/1999 | Wells et al. | | 711/103 |
| 6,073,207 A * | 6/2000 | Ideta | | 711/103 |
| 6,085,299 A | 7/2000 | Angelo et al. | | |
| 6,185,696 B1 * | 2/2001 | Noll | | 714/6.1 |
| 6,253,281 B1 * | 6/2001 | Hall | | 711/112 |
| 6,260,157 B1 * | 7/2001 | Schurecht et al. | | 714/6.13 |
| 6,279,153 B1 | 8/2001 | Bi et al. | | |
| 6,446,238 B1 | 9/2002 | Canestaro et al. | | |
| 6,523,083 B1 * | 2/2003 | Lin et al. | | 711/103 |
| 6,536,034 B1 * | 3/2003 | Nassor | | 717/110 |
| 6,640,334 B1 * | 10/2003 | Rasmussen | | 717/171 |
| 6,665,813 B1 * | 12/2003 | Forsman et al. | | 714/15 |
| 6,718,407 B2 | 4/2004 | Martwick | | |
| 6,745,325 B1 * | 6/2004 | Gavlik | | 713/100 |

(Continued)

FOREIGN PATENT DOCUMENTS

| | | |
|---|---|---|
| TW | I252397 | 4/2006 |
| TW | 200615963 | 5/2006 |
| TW | 200639860 | 11/2006 |

*Primary Examiner* — Lewis A Bullock, Jr.
*Assistant Examiner* — Christine Dang
(74) *Attorney, Agent, or Firm* — Slayden Grubert Beard PLLC

(57) ABSTRACT

A system in which firmware residing in ROM may be upgraded without re-spinning silicon. A one-bit flag may be assigned for each patchable function representing a firmware upgrade. The first statement of each function may check its associated flag and determine if patch-code should be executed in place of the current function residing in ROM. If the flag is not set, the code may continue executing normally. If the flag is set, a function identifier may be placed into a global memory location, and an assembly language "jump" instruction may be executed, redirecting program control to a specified location in a volatile Scratch Read Only Memory (SROM) where the corresponding patched code may be stored. If more than one function is patched, the global identifier may be used to determine which patched function to execute. Using an assembly language "jump" instruction to redirect control results in the patched function's returning normally to its calling function once it has completed executing.

15 Claims, 4 Drawing Sheets

(56) References Cited

U.S. PATENT DOCUMENTS

| | | |
|---|---|---|
| 6,834,340 B2 | 12/2004 | Lee et al. |
| 6,880,048 B1 | 4/2005 | Lemke |
| 6,891,765 B2 | 5/2005 | Saado |
| 6,904,457 B2 | 6/2005 | Goodman |
| 6,918,017 B1 | 7/2005 | Lemke |
| 7,039,776 B2 | 5/2006 | Wong et al. |
| 7,043,597 B2 * | 5/2006 | Lei et al. ............... 711/103 |
| 7,051,231 B2 * | 5/2006 | Chi ..................... 714/6.13 |
| 7,099,990 B2 | 8/2006 | Blangy |
| 7,191,437 B1 | 3/2007 | Coatney et al. |
| 7,203,581 B2 | 4/2007 | Okada |
| 7,219,343 B2 | 5/2007 | Almeida et al. |
| 7,222,339 B2 | 5/2007 | Rothman et al. |
| 7,251,706 B2 | 7/2007 | Lei et al. |
| 7,320,126 B2 | 1/2008 | Chang et al. |
| 7,325,231 B2 | 1/2008 | Tu et al. |
| 7,404,184 B2 | 7/2008 | Fisher et al. |
| 7,523,299 B2 * | 4/2009 | Yu et al. ..................... 713/2 |
| 7,546,596 B2 * | 6/2009 | Needham ............... 717/169 |
| 7,596,721 B1 * | 9/2009 | Flake et al. ............. 714/42 |
| 7,971,199 B1 * | 6/2011 | Chen ..................... 717/168 |
| 2002/0170050 A1 * | 11/2002 | Fiorella et al. ......... 717/168 |
| 2002/0188886 A1 * | 12/2002 | Liu et al. ................... 714/6 |
| 2003/0221092 A1 * | 11/2003 | Ballard et al. ............. 713/1 |
| 2004/0025087 A1 * | 2/2004 | Chi ........................ 714/38 |
| 2005/0155030 A1 * | 7/2005 | DeWitt et al. ........... 717/168 |
| 2005/0229172 A1 * | 10/2005 | Tu et al. ................. 717/168 |
| 2005/0251673 A1 * | 11/2005 | Bosley et al. ............. 713/2 |
| 2006/0107104 A1 * | 5/2006 | Alexandre et al. ........ 714/8 |
| 2006/0174244 A1 * | 8/2006 | Woods et al. ............ 717/174 |
| 2007/0081386 A1 | 4/2007 | Yoon |
| 2007/0094655 A1 * | 4/2007 | Rostampour ............ 717/168 |
| 2008/0016268 A1 | 1/2008 | Lei et al. |
| 2008/0082826 A1 | 4/2008 | Ahlquist |
| 2008/0083030 A1 * | 4/2008 | Durham et al. ............ 726/22 |
| 2008/0098162 A1 | 4/2008 | Yang |
| 2009/0327650 A1 * | 12/2009 | Neuerburg ............... 711/219 |

\* cited by examiner

FIRMWARE ROM PATCH METHOD

BACKGROUND OF THE INVENTION

1. Field of the Invention

This invention relates generally to the field of ROM-based system design, and more particularly, to the design of a system in which firmware modules or subroutines residing in ROM may be upgraded without re-spinning silicon.

2. Description of the Related Art

In computing, firmware typically refers to software embedded in a hardware device such as a read-only memory (ROM), most often implemented as an integrated circuit. Firmware can also reside in an erasable programmable read-only memory (EPROM) chip whose program may be modified by special external hardware, oftentimes utilizing optical means such as ultraviolet light, or an electrically erasable programmable read-only memory (EEPROM) chip whose program may be modified by special electrical external hardware different from the ultraviolet light used for configuring EPROMS (as mentioned above).

In general, EEPROMS have become fairly fast, large and comparatively inexpensive to manufacture, allowing them to compete with floppy disks, small hard disks and small CD-ROMs. One of the most popular forms of firmware storage that doesn't require any battery support is found in the form of flash memory or flash cards, which are usually inserted into various digital devices and are used for general storage.

In one aspect, firmware has evolved to also represent programmable content of a hardware device, which can consist of machine language instructions for a processor, or configuration settings for a fixed-function device, gate array or programmable logic device. Even though in many respects firmware is as much a software component of a working system as the operating system, unlike most modern operating systems, firmware rarely has a well established mechanism for updating itself to fix bugs or addressing functionality issues that are detected after a system that operates according to the firmware is shipped.

Thus, a typical common feature of present-day firmware is that it can be updated post-manufacturing without the need for additional hardware, either electronically, or by replacing a storage media such as a socketed memory chip, often using vendor-provided software, or a binary image file often referred to as a ROM image, which are uploaded onto existing hardware by a user. A ROM image typically contains a copy of the data from the ROM chip holding a computer's firmware. ROM images can also be used when developing embedded systems. Software which is being developed for an embedded system can be written to ROM files for testing on a standard computer before being written to a ROM chip for use in the embedded system.

In practical terms, firmware updates can improve the performance and reliability, indeed even the basic available functionality of a device, and many devices benefit from regular firmware updates. One of the most common devices to have regular firmware updates are recording devices such as optical media writers (DVD, CD, Blu-Ray), and as the various media technologies evolve, firmware updates can facilitate keeping hardware components compatible and up to date.

Comprehensively, it can be argued that many devices attached to modern systems operate as special-purpose computers of their own, running their own software, which is represented as firmware in a ROM within the device itself. Over the years, however, manufacturers have found that loading the firmware from the host system is both cheaper and more flexible. As a result, much of the hardware currently on the market is unable to function in any useful way until the host computer has loaded onto it the requisite firmware.

Finally, while cost and performance requirements combined with the developments described above have driven component vendors to adopt various replacements to the traditional ROM, including non-volatile media such as EEPROM and Flash, or SRAM solutions, such as the firmware loaded by an operating system device driver, in many systems a ROM may still provide the best and sometimes the only economically viable solution for storing firmware. This is especially true in systems where the firmware is stored on the same piece of silicon where the rest of the system is configured, as in certain embedded systems-on-a-chip (SOCs). Making modifications to firmware that is stored in an on-chip ROM typically requires a re-spin (metal layer change) to that device, making revisions to any such device expensive, time consuming, and difficult.

Certain architectures, for example Tiny Open Firmware (TOF—http://www.tinyboot.com/patches.html) allow for patching firmware residing in a ROM. Of course the ROM or the ROM content (code) is itself not changed. Instead, the code structure uses a RAM-based area of code space referred to as the binding table. All function calls for functions originally configured in the firmware residing in the ROM are actually made into the binding table. The entries in the table usually comprise jump instructions. They can be changed at will, to point to any subroutine. Essentially, different actions are bound to different token values.

The binding table makes it easy for other languages to invoke TOF functions. TOF may be used as a foundation on which to build a C application, allowing simple plug-and-play operation (and debugging) below the application level. In this case, the system may be considered a single object, with each subroutine representing a method. Almost all of these methods may be late-bound, but in an efficient way that doesn't impact run time much.

This makes patching any subroutine fairly straightforward. The evaluator loads boot code from a serial EEPROM at power up. This code causes patches to be compiled into RAM. It also changes the binding table to point to the new code. However, the program RAM requirement precludes many single-chip solutions, since most microcontrollers have insufficient or non-existent program RAM. While some 32-bit microcontrollers and some Digital Signal Processors (DSPs) could run TOF in single chip mode, TOF would have to be ported to them, a task that could prove expensive and possibly time consuming. Another method for generating an object file that facilitates patching and the introduction of new functionality for firmware stored in a ROM is found in U.S. Pat. No. 5,546,586.

While the above referenced solutions address the issue of patching firmware stored in a ROM, they can be costly and/or inefficient. For example, the need for jump tables with function pointers is space inefficient because function pointers occupy more space. In addition, all functions that may potentially require being patched need to be determined in advance, and changes to an original function would require a manual update to the Jump table with the corrected or new function address and/or pointers.

Other corresponding issues related to the prior art will become apparent to one skilled in the art after comparing such prior art with the present invention as described herein.

SUMMARY OF THE INVENTION

In one set of embodiments, a new firmware patching technique may enable fixing problems and adding additional features to firmware-controlled systems, including but not limited to systems configured within integrated circuits that also contain a Read Only Memory (ROM) used for storing the firmware. A firmware-controlled system and/or device configured according to principles of the present invention may include a programmable memory component, which may be a hardware component such as Random Access Memory (RAM), which may be modifiable from an external source and may be operable to overlay a portion of the ROM or One Time Programmable (OTP) memory holding the firmware within the system/device. This programmable memory component is herein referred to as Scratch ROM or SROM. In one embodiment, patched firmware code is written into the SROM.

The new firmware patching technique may be used in a variety of systems, including systems configured in accordance with two fundamental types of computer architectures, namely Harvard architecture and von Neumann architecture. RAM may be used for data-variable space in the Harvard architecture. Data-variable space may be configured separately from the code-space, which may be located in ROM. Different assembly language, or machine instructions may be used to access each type of memory. In a Harvard-architecture system, memory addresses are typically distinct—for example, a code address of 0x0400 is considered to reference a different location than a data address of 0x0400—while in a von Neumann-architecture system, there are typically no separate instruction sets for accessing data and code, the same instruction set may be used for accessing both. Any memory space may be used for either data or code. In a practical firmware implementation, the code space may be implemented in ROM or OTP, while the data space may be configured in modifiable memory locations and may be implemented using RAM.

The SROM may be designed to support either of the two fundamental computer architectures referenced above. The system may be configured to overlay a predetermined area of original program memory with the patched code, once the patched code has been written to the SROM. In case of an SROM configured within a system that operates according to the Harvard architecture, the SROM may be configured to emulate program memory that is addressable only as code space. In case of a system that operates according to the von Neumann architecture, a portion of the original program memory may be overlaid with the patched firmware code. A specialized software technique may be used in both cases to overlay at least a portion of the original program code with the patched firmware code.

In one set of embodiments, the specialized software technique may include assigning a flag to each patchable function. The first statement of each function may check its associated flag and determine if patch code should be executed in place of the current function present in the firmware residing in the ROM. If the flag is not set, then the code may continue to execute normally. If the flag is set, then an identifier may be placed into a global memory location, and an assembly language "jump" instruction may be executed, redirecting program control to a predetermined location in the SROM. A "jump" instruction may be preferred to a "call" instruction, as a "call" instruction would typically add an additional return address to the program's stack, while a "jump" instruction will leave the stack intact. To support patching more than one function, a global identifier and a conditional statement may be configured at a given location in the SROM, to determine which patched function to execute. Another assembly language "jump" instruction may be executed to redirect program execution to the correct patched function, while the stack remains intact.

Each patched function may use the same parameter list as the original un-patched function, enabling the parameters for the original function and the patched function to remain in the same place, whether located in data space, in registers, or on the stack. The patched function may execute from within the patched SROM area, and—once the patched function has completed executing—return as if it was the originally "called" function, thereby popping the correct return address from the stack. Any data passed on the stack during execution of the patched function may also be cleaned up at this time. Any data returned from the patched function may be passed back to the original calling function in the same manner in which data from an un-patched function would have been returned.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
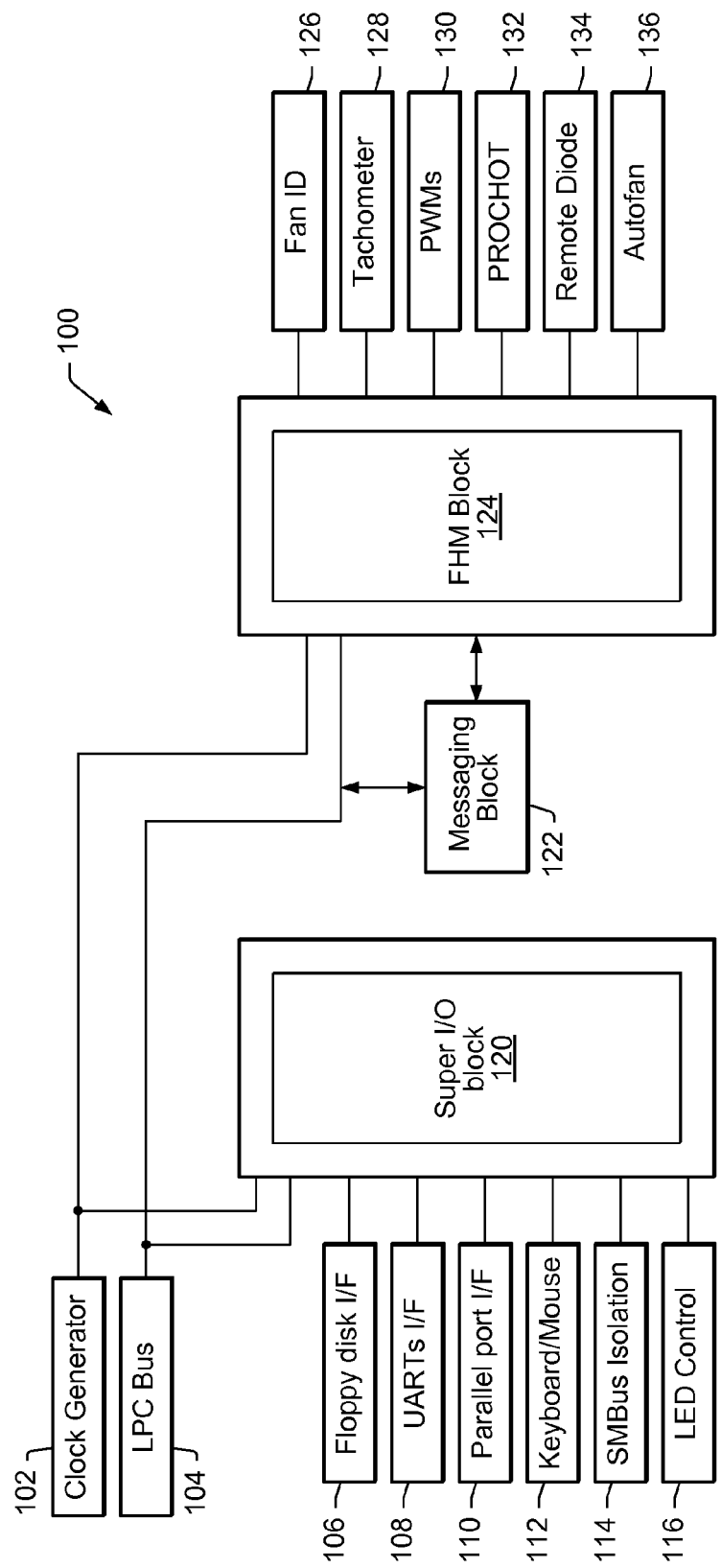
FIG. 1 shows a functional block diagram of a system configured to provide multiple functionality within a computer system, using firmware that can be updated according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a "set of instructions" may refer to one or more instructions. More specifically, in some embodiments, "instructions" may refer to programming code, software, and/ or functions implemented in the form of a code that is executable by a controller, microprocessor, and/or custom logic circuit adapted to execute these instructions. In some embodiments, these instructions may comprise device drivers, control software, and/or machine code.

In one set of embodiments, a functional block 100, which is shown in FIG. 1 and may be an integrated circuit (IC), may be configured to provide fan control, hardware monitoring, and/or super input/output (I/O) functionality within a computer system. A hardware based Super Input/Output (I/O) portion 120 of the IC may operate ports configured to control devices including but not limited to one or more of parallel port devices 110, floppy disks 106, keyboard and mouse 112, Universal Asynchronous Receiver/Transmitters (UARTs) 108, Light Emitting Diodes (LED) 116, and System Management Bus (SMBus) devices 114. Application firmware and associated hardware may be configured to control the hardware monitoring functions of the system, and to ensure that the temperature of various components of a coupled computer system (or systems) is (are) kept within acceptable limits. Super I/O block 120 may be coupled to a Firmware and Hardware Monitor (FHM) block 124 via Low Pin Count (LPC) bus 104, and a system clock provided by clock generator 102. FHM block 124 may be configured to include an embedded microcontroller (EM), such as an Intel 8051-based EM, for executing a variety of monitoring functions, as well as a masked Read Only Memory (ROM) component holding the application firmware. As part of its monitoring functions, FHM block 124 may generate and/or receive a variety of control signals including but not limited to one or more of a Fan ID signal 126, a tachometer signal 128, Pulse Width Modulated (PWM) signals 130, remote diode sense signals 134, and autofan signals 136. In one set of embodiments, for example embodiments utilizing the 8051-based EM, a messaging module 122 may be coupled between LPC bus 104 and FHM block 124 to facilitate 8051-LPC messaging on LPC bus 104.

ROM-based devices such as the ROM configured in FHM block 124 and where the application firmware may reside, typically have their application firmware manufactured with a ROM pattern that cannot be modified in the field without a special mechanism. Additionally, ROM code updates on these devices may be very costly. In one set of embodiments, FHM block 124 may also include a scratch-ROM (SROM), which may be a writable memory, configured in conjunction with a mechanism (the combination of SROM and said mechanism herein further referred to as SROM implementations) aimed to reduce the costly turnover for quick fixes in the field of operation, that is, to perform fixes once functional block 100 is operating. The SROM implementations may provide a mechanism to download patch code for quick fixes in the firmware, provide means to download one or more tasks for debugging purposes or for a test features, and may provide means to download one or more test programs. It should be noted that as used herein, a ROM may refer to any type of memory that cannot be rewritten or overwritten once it has been programmed, also referred to as non-rewritable memory, and SROM may refer to any type of memory that may be written, rewritten or overwritten. Thus, examples of ROM may include standard ROMs and One Time Programmable (OTP) memories, and examples of SROM may include Random Access Memory (RAM) such as static and/or dynamic RAMs, OTP memories, or any other memory that may be written at least once. In embodiments requiring the most flexibility, the SROM may be implemented as a RAM, allowing multiple patching and greater control over updating firmware and/or downloading modified code into device 100 multiple times.

Therefore, the SROM implementations may be used for fixing problems and adding additional features to firmware controlled systems, such as, for example, device 100 in FIG. 1. A programmable memory hardware component, such as Random Access Memory (RAM) may be configured as an SROM that may be modified from an external source and overlay a portion of a Read Only Memory (ROM) or One Time Programmable (OTP) memory within the device. The patched code may be written into the SROM, and configured to overlay a specified area of original program memory.

In one set of embodiments, the SROM implementations may include a one-bit flag assigned for each patchable function. The first statement of each function may check its associated flag and determine if patch code should be executed in place of its current function contained in the firmware code that resides in the ROM (such as the ROM in FHM block 124 shown in FIG. 1). If the flag is not set, then the code may continue executing normally. If the flag is set, then a function identifier may be placed into a global memory location, and an assembly language "jump" instruction may be executed, redirecting program control to a specified location in the SROM. If more than one function is patched, the global identifier may be used to determine which patched function to currently execute. When using an assembly language "jump" instruction to redirect control, the patched function may return normally to its calling function.

An SROM patch area designated within the SROM may be downloaded from an external entity, for example a host PC, and may consist of the following:
  an interrupt vector table
  a packed array of one bit flags
  a global identifier
  a conditional statement that dispatches the program to the
    patched function(s), and
  patched code.

In an un-patched ROM, the same patch area may consist of the following:
  an interrupt vector table, and
  a packed array of one bit flags, all of which may be set to
    zero.

When employing SROM implementations for patching firmware that resides in a ROM, only a small amount of code may need to be executed to determine if a function is patched. Furthermore, the impact on program execution time may be negligible, and any function within the firmware may be patched. Since "jump" instructions may be used in lieu of "Calls", the stack may be kept intact, providing an easy mechanism for returning back to the calling function. More specifically, using assembly language "jumps" allows easy handling of variable length parameter lists for the functions, since the patched function's parameters may be left intact for use in the replacement function. In other words, the parameter list from the original function may match the replacement function. In addition, any return values from the patched function would match the replacement function.

In one aspect, locating the SROM patch space such that it overlays the interrupt vector table may also allow for patching the interrupts. Patching interrupts does not require a patch flag or a "jump" instruction as described above, the new vector may simply overlay the original at the appropriate address, and the new code may be placed in the SROM area. Interrupt vectors may be automatically reassigned when the project is recompiled.

Jump tables common in current systems attempting to patch ROM firmware may be considered wasteful as they normally have to reserve space for vectors of all the patchable functions. In SROM implementations consistent with the present invention, jump tables are not needed or required. Each patchable function may check the one bit flag and make a decision whether or not to jump to the patch space, or SROM. If the bit is set, a function identifier may be placed in a global variable before the jump. Once the code begins executing in the SROM, the ID may be used to jump to the proper patch code to execute. A significant amount of valuable patch memory may potentially be saved by not using a vector table.

Furthermore, when using jump tables, it may oftentimes be necessary to determine the address vector of a patched function and manually code that address into the jump (or vector) table. Manual intervention will typically increase the probability of introducing errors. In SROM implementations, the code for the patched functions may be separated into its own source module and may contain its own data and program space. It may easily be re-compiled as the last module to be linked into the original un-patched project. This may enable the linker to automatically assign, or bind, any addresses that are used by the patched code or the new code, thereby eliminating manual intervention. Only one address may need to be specified, and the location of the conditional statement may be the one configured in SROM, always at the same location.

The packed-array of one bit flags may provide the flexibility to enable or disable an individual patched function at any time after downloading the SROM components. Creating a patch, as described herein, may ensure that all the code above the patch area (SROM) is exactly the same for the patched and un-patched versions, thereby ensuring that calls from within the original ROM code to the patch code and from the patch code to the original code are valid. A downloadable task may also be developed for the system configured with an SROM implementation, e.g. device 100 in FIG. 1, using the patching mechanism. A downloadable task may comprise one or more new features or piece of test software that may be executed in addition to the features currently supported by device 100. During normal operation, the kernel scheduler may call the debug task. In one set of embodiments, the debug task may be patched to contain some new functionality or test. Other functions may similarly be patched to contain additional features. In addition to patching an existing feature, creating a downloadable task, or incorporating a piece of test code into a routine, it may also be possible to create an entire piece of test code that runs solely in the SROM (or patch ROM).

Figure 2:
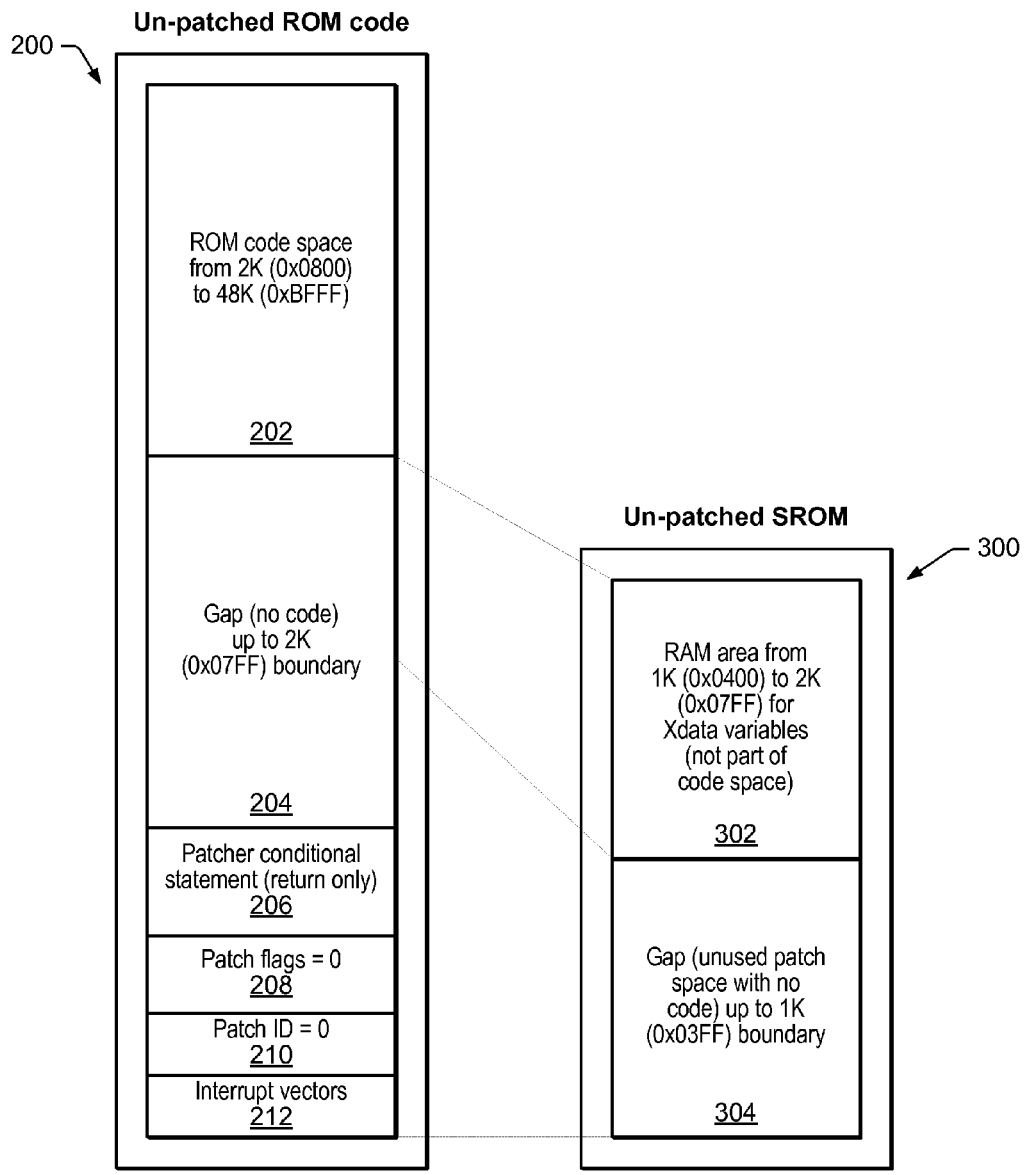
FIG. 2 shows a memory map providing a comparison of an un-patched ROM and an un-patched SROM according to one embodiment of the present invention, where the ROM space has not been overlaid with the patch and the patch has not been written to the SROM.
Figure 3:
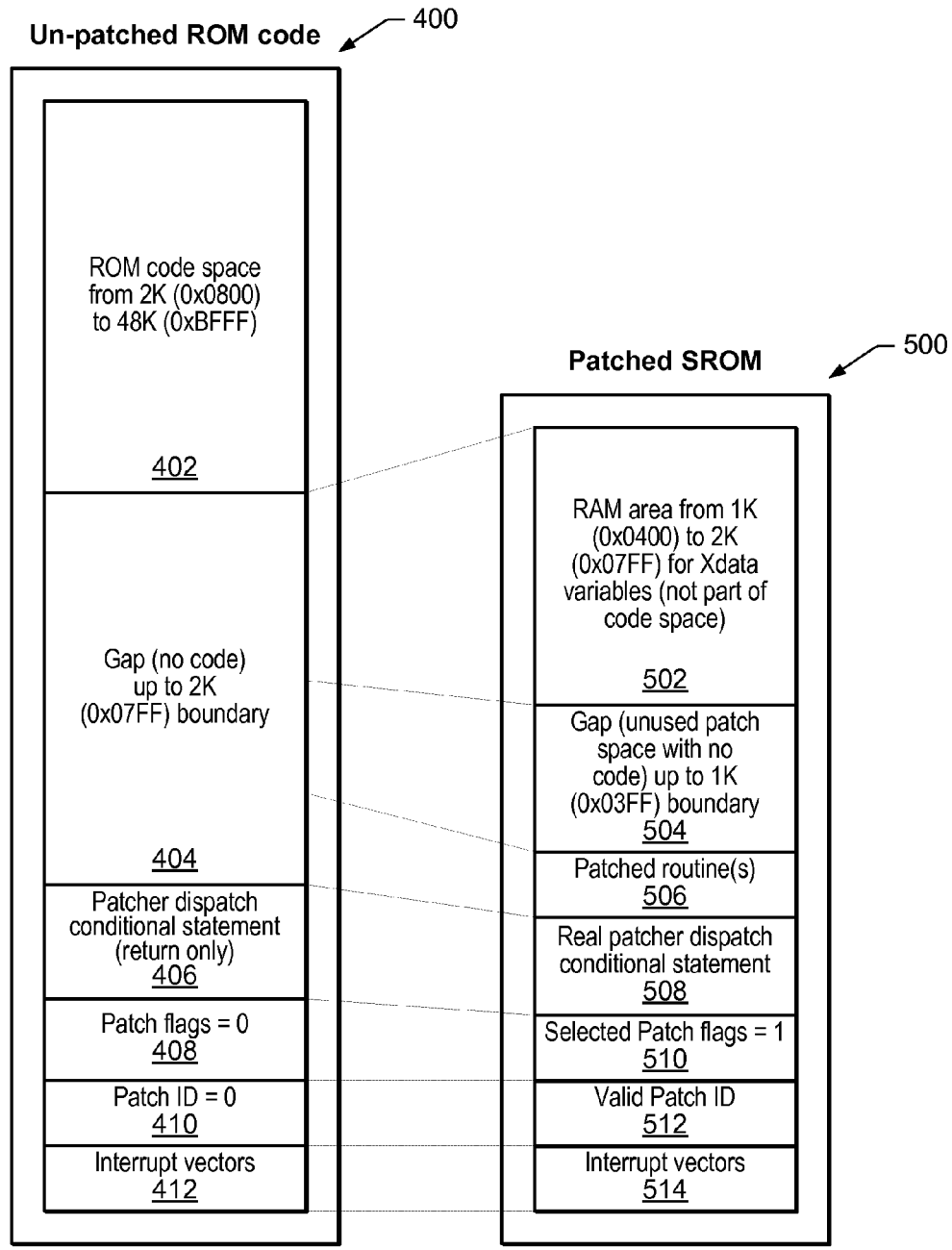
FIG. 3 shows a memory map providing a comparison of an un-patched ROM and an SROM containing a patch according to one embodiment of the present invention, where the ROM space has not been overlaid with the patch, but the patch has been downloaded in a data stream to the SROM.

In one set of embodiments, FHM block 124 may comprise a 2 KB SROM, which may be located from address 0x0000 to 0x07FF. FIGS. 2 and 3 show various configurations of the memory for the ROM and SROM, according to some embodiments. The SROM (see 300 in FIG. 2 and 500 in FIG. 3) may be divided into four segments of 512 bytes each. Each memory block may be configured as either ROM or RAM. Except for the patch code routines, which may start at address 0x009B, the remaining code may start at address 0x0800 (see 202 in FIG. 2 and 402 in FIG. 3). In alternate embodiments, the remaining code may be located at address 0x0400, using address 0x0800, however, may allow for future expansion. The two segments, containing a total of 1024 bytes, starting at data address 0x0400 and continuing to address 0x07FF, may be used as external data space (Xdata—see 302 in FIG. 2 and 502 in FIG. 3). The SROM implementation may be configured to use the lower half of the 2 KB from address 0x0000 to address 0x03FF (see 304 in FIG. 2 and 504 in FIG. 3). Interrupt vectors may be located in the lower portion of this memory area (see 514 in FIG. 3), making it possible to change an interrupt vector by directly overlaying it with a new address in the SROM. The new interrupt code may also be located in the SROM.

The space above the interrupt vectors may be specified to hold the patch identifying information (see 512 in FIG. 3), flag data structure and patch related code (see 508 and 510 in FIG. 3). The patch identifying information may begin at code location 0x0030 and may include, for example, a company's initials followed by the firmware ID, patch number, and the firmware build number. A packed array of bits may be configured to hold the flags that indicate whether a function has been patched. Each bit may represent a single function out of the specified number of functions (e.g. 300 functions in some embodiments) within the firmware. The structure may begin at code address 0x006B and may comprise enough bytes to provide one respective (flag) bit for each patchable function, or portion of the original firmware. In the embodiment shown, the structure comprises 48 bytes. In alternate embodiments, additional bytes may also be included for future expansion. Each function may have a unique identifier, which may be defined and listed in a separate file. When a flag bit is checked and found to be set, the program may place the function's unique identifier into a global variable, and jump to location 0x009B, which may be holding the patcher function, and may continue program execution from that location. Since more than one function may be patched at a time, the patcher code may check the global variable to determine which patched function to execute, then jump to that function. It should be noted that checking the respective flag bits may be performed via code that itself resides in the ROM. Furthermore, a function call made to a patched function from a function residing in the ROM may result in a jump to the SROM for executing the patched function, and a return back to the ROM.

In one set of embodiments, functions within the firmware of device 100 may be configured to contain more than three parameters. Consequently, the compiler for device 100 may be configured to pass up to three function parameters in the registers of the controller/CPU configured in FHM block 124. Other embodiments using different controllers and/or CPUs may be configured to use more or less parameters. The patched function may be written to contain the same number and type of parameters as the original function, ensuring that the parameters are passed in the same registers as they would if the original code was being executed. When the patched function completes, the code may return normally, popping the return address off the stack, thereby skipping the balance of the original function and returning to the calling function. If the original function passed back a value, then the patched function may thereby also return the same value.

Options for the compiler may need to be specified in advance in order to position code and data segments as described above. In one set of embodiments this may be performed via a user interface comprising a graphical user interface (GUI) displayed on-screen, through a series of pull-down menus, where various options may be selected and/or specified. For example, addresses of the code, Xdata, Idata and stack may be set in this manner. In one embodiment, one of the settings may be used to prevent the linker from using the global data space for overlaying variables for certain modules. Since the patcher module may be called from any function, it may be preferable for the patcher module not to share data space with any other functions in order to ensure that data does not become corrupted.

When creating an actual patch, it may become important to look at the patched and un-patched code to ensure that the data variables have not moved. Data variables would normally not move if code were added only to the patcher module. However, between releases, if the baseline code is modified, then it may be possible for the data group or the global function ID to move. Adjustments may be required in these locations to avoid having new variables intermixed with patcher variables, because the order of the variable locations may change between patched builds, yielding undesirable results.

It should be noted that certain functions within the firmware may not easily be patched. These functions may primarily include initialization code and the EM (Embedded Microcontroller) interface. The EM interface typically provides a mechanism that enables an external process to communicate with the microcontroller comprised in FHM block 124. The initialization code typically runs before the EM interface becomes available, and preventing the patched code from being loaded via the EM interface until initialization completes. Patching the EM interface itself may also present challenges, as a working interface would be required to move the patch data from the EM interface into the SROM patch area. Without a working interface, transferring a patch may become overly difficult if at all possible.

It should also be noted that it may be preferable to avoid placing recursive calls for downloaded or patched functions. In addition, in some embodiments it may also be preferable to keep the code size from exceeding the 1 KB boundary (this may not be an explicit preference in other embodiments). Whenever downloading any type of code, such as a downloadable task, patch code, or test function, the final binary may include the original vectors, considering that once the SROM has been configured as ROM, the patchable functions in the ROM code or kernel scheduler would typically call SROM locations.

Referring again to FIG. 2, a memory map providing a comparison of one embodiment of an un-patched ROM space 200 and an un-patched SROM space 300 is shown. For the purposes of illustrating memory configurations and memory space allocation, as used herein "ROM space" and "SROM space" refer to the allocation of memory space for the respective non-volatile ROM and volatile SROM devices. However, when referencing downloading code and/or moving data into ROM space and SROM space, such downloading and/or data movement is understood to take place in the physical ROM and SROM devices. In FIG. 2, ROM space 200 has not been overlaid with the patched code and the patched code has not been written to SROM space 300. The sizes for the code space may be specified according to system requirements and other specifications that may relate to the system (e.g. device 100 in FIG. 1) operating according to the designated firmware (e.g. the firmware in the ROM comprised in FHM block 124 in FIG. 1). As seen in FIG. 2, the un-patched ROM code, or un-patched ROM space 200 may comprise ROM code space 202, a reserved (no code) space 204, space for a patcher conditional statement 206, space for patch flags 208, patch ID 210, and interrupt vectors 212. SROM space 300 may comprise RAM area 302 for Xdata variables and reserved space 304. RAM area 302 may be configured to occupy space that is not part of code space.

Referring now to FIG. 3, a memory map providing a comparison of one embodiment of un-patched ROM space 400, and SROM space 500 containing a patch is shown. In FIG. 3, ROM space 400 has not been overlaid with the patch, but the patch has been downloaded in a data stream to SROM space 500. In the embodiment shown in FIG. 3, patched routines 506, real patcher dispatch conditional statement 508, selected patch flags 510, valid patch ID 512, and interrupt vectors 514 have been downloaded into SROM space 500. The data stream may be downloaded to SROM space 500 using the EM interface. As shown in FIG. 3, the SROM control bits for the two lower banks 502 and 504 have not yet been set.

Figure 4:
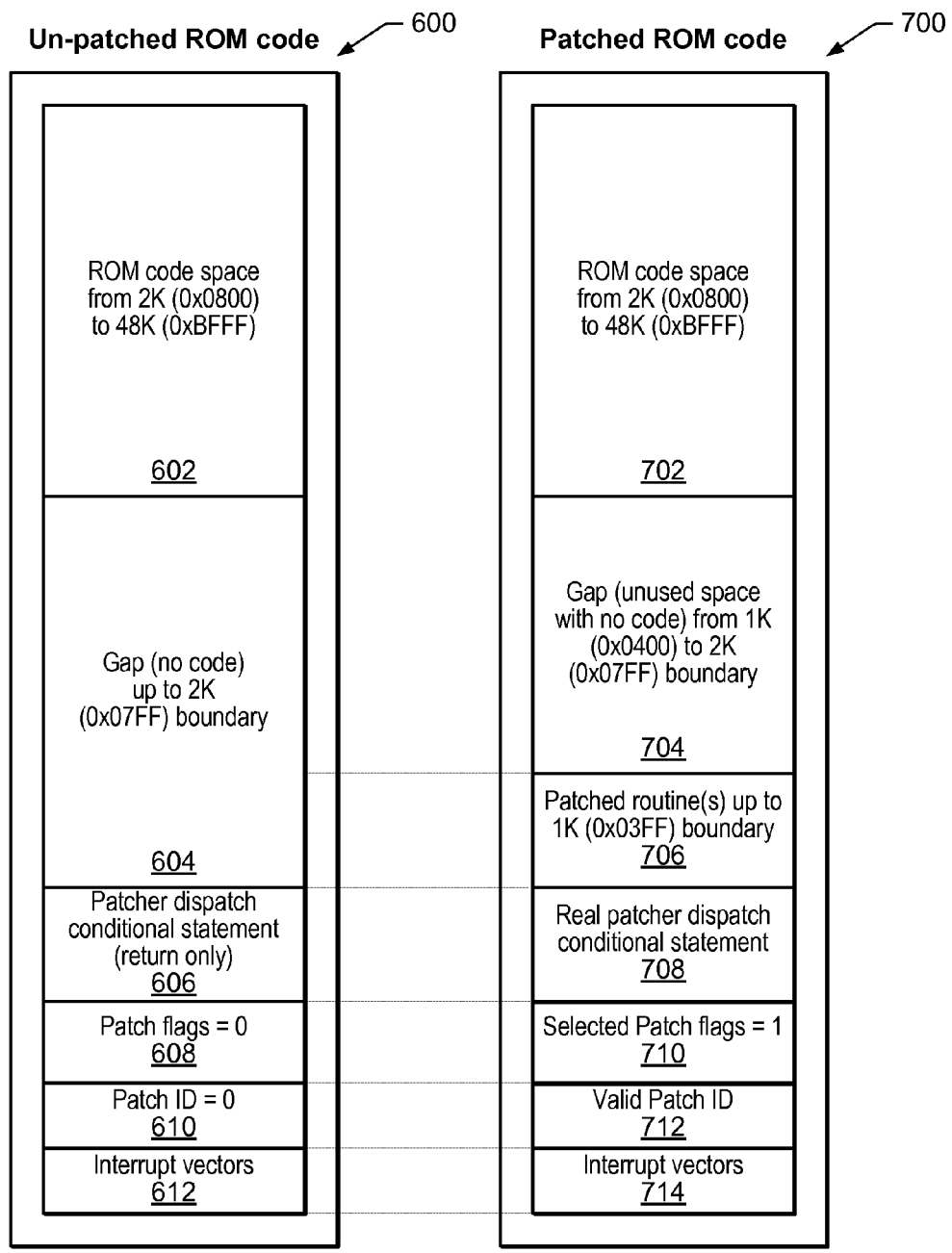
FIG. 4 shows a memory map providing a comparison of an un-patched ROM and a patched ROM according to one embodiment of the present invention, where the ROM code has been effectively overlaid by the SROM space containing the patch.

FIG. 4 shows a memory map providing a comparison of one embodiment of un-patched ROM space 600 and patched ROM space 700. As shown in FIG. 4, ROM space 600 may be effectively overlaid by SROM space 500 (from FIG. 3) containing the patch, to produce patched ROM space 700, which now contains patched routines 706, real patcher dispatch conditional statement 708, selected patch flags 710, valid patch ID 712, and interrupt vectors 714.

SROM implementations thus provide an effective, flexible and inexpensive means for upgrading firmware residing in ROM. While in certain systems an Electrically Programmable ROM (EPROM) solution may be possible since EPROM devices can be reprogrammed in the field, once these devices are programmed, the micro-controller would access them as Read Only Memory (ROM). Furthermore, EPROM devices typically contain more transistors than ROM devices, making EPROM devices larger than ROM devices, and oftentimes contained in a separate chip within a system. Size and cost requirements may preempt many systems from storing firmware on an EPROM. Although One Time Programmable (OTP) devices that appear as ROM devices to the end user exist, ROM devices come from the factory pre-programmed and cannot be altered once manufactured. Once these ROM devices are in the field, the only way to modify them may be to remove them and replace them, or bypass them.

In contrast an SROM may be similar to volatile system memory, like a computer's Random Access Memory (RAM) for example, with the added benefit of being configurable to overlay part of the ROM space. Once the SROM has been programmed, a switch may be set by the host to overlay part of the ROM and logic with at least a part of the SROM as described above, to redirect the program execution to the SROM. This may be performed to fix a potential bug, provide operating enhancements or perform various tests, among others. Because the SROM is specified to be a volatile memory, when a device is powered down, the contents of the SROM memory are erased, and the SROM may be re-programmed each time the power cycles, providing flexibility for patching firmware.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for patching a firmware comprising firmware instructions residing within a non-rewritable memory (NRM) comprised in a system, wherein the firmware instructions provide a plurality of functions of said firmware and are mapped to a first area of program memory in the NRM, the method comprising:

providing a re-writable memory operable to store patching information in a first section within the re-writable memory and overlay the re-writable memory on a second area of the program memory, wherein the patching information comprises a plurality of flags in a packed array of one-bit flags defaulting to a reset state, wherein each flag is associated with a respective a single function of said firmware;

for a subset of functions of the plurality of functions that are required to be patched:
setting each respective flag associated with the respective function of the subset of functions in said first section indicating the function needs to be patched, and writing patching instructions associated with the respective function of the subset of functions into a second section of the re-writable memory;
bypassing setting the flag in said first section if the function associated with the flag is not to be patched; and executing the plurality of functions in said first area of program memory, wherein each function comprises a first statement which when executed, first checks the respective flag associated with the executing function in said first section of the re-writable memory to determine whether to execute patching instructions associated with the at least one executing function within the second section of the re-writable memory if the respective flag is set, or instructions of the function as originally stored in the first area of program memory if the respective flag is not set.

2. The method of claim 1, further comprising: setting a flag for each function to be patched and writing associated patching instructions into the second section of the re-writeable memory.

3. The method of claim 1,
wherein the firmware instructions include a jump instruction which causes a jump to a third second section of the re-writable memory comprising a patcher function for directing execution to the second section of the re-writeable memory containing the patching instructions of the respective function.

4. The method of claim 3, further comprising:
wherein the patch instructions include a jump instruction which points back to the firmware instructions in said first area of program memory.

5. The method of claim 4,
wherein the re-writeable memory comprises a fourth section which stores interrupt vectors.

6. The method of claim 1,
wherein the re-writeable memory comprises a fifth section which stores a patch identifier and wherein patching information further includes replaced interrupt vectors in said fourth section.

7. The method of claim 1, wherein at least one instruction in the third section of the re-writeable memory is an instruction that receives a function's unique identifier as a global variable to determine which patched function to execute and then jumps to a respective patched function in the second section of the re-writable memory.

8. A method for updating one or more functions wherein each function of the one or more functions is implemented by a set of firmware instructions comprised in program code residing within a first memory area of a read-only memory (ROM), the method comprising:
overlaying a second memory area of the ROM with respective memory of a re-writable memory, the re-writable memory operable to store patching information in a first section within the re-writeable memory, wherein the patching information comprises a plurality of flags in a packed array of one-bit flags defaulting to a reset state, wherein each flag is associated with a respective single function implemented by the set of firmware instructions;

for a subset of functions of the one or more functions that are required to be patched:
setting each respective flag associated with the respective function of the subset of functions in said first section of the re-writable memory, and writing patching instructions associated with the respective function of the subset of functions into a second section of the re-writable memory;
executing a function of the one or more functions in said first memory area, wherein each function comprises a first statement which when executed, first checks the respective flag associated with the executing function in said first section of the re-writeable memory;
executing a jump to a patcher function within the second section of the re-writable memory if the respective flag indicates that the function is patched, wherein the patcher function receives information identifying the function to be patched and jumps to the set of instructions implementing the patch in the second section of the re-writable memory; and
resuming execution of program code in the first memory area of the ROM once the patch has been executed;
executing instructions of the function as originally stored in the first memory area of the ROM if the respective flag is not set.

9. The method of claim 8, further comprising:
executing the set of firmware instructions, if the flag does not indicate that the function is patched.

10. A system comprising:
a non-writable memory (NRM) configured to store a set of firmware instructions in a first memory area of program memory wherein the set of firmware instructions implement a plurality of functions;
a rewritable memory configured to store:
at least one set of patch instructions for patching an associated function of said firmware in a first section of the rewritable memory; and
a plurality of flags in a packed array of one-bit flags in a second section of the rewritable memory, wherein each flag is associated with a respective single function of the plurality of functions, and each flag indicates whether an associated function is to be executed by an associated set of patch instructions in said first section of the rewritable memory or the set of firmware instructions as stored in the first memory area of the NRM; and
a processing unit configured to:
execute a first portion of the set of firmware instructions of a function in the first memory area of the NRM, wherein instructions of the first portion check the respective flag associated with the executing function;
execute the set of firmware instructions as originally stored in the first memory area of the NRM if the respective flag is not set; and
execute the patch instructions associated with the executing function in the first section of the rewritable memory if the respective flag is set.

11. The system of claim 10, wherein the processing unit is configured to execute a jump to a patcher function within the rewritable memory if an associated flag indicates that the function is patched, wherein the patcher function receives information identifying the function to be patched and jumps to a set of instructions implementing a patch of the function.

12. The system of claim 10, wherein the set of instructions include a jump instruction which points back to the firmware instructions in said NRM.

13. The system of claim 10, wherein the rewriteable memory comprises a section which stores interrupt vectors.

14. The system of claim 13, wherein the re-writeable memory comprises a fifth section which stores a patch identifier.

15. The system of claim 10, wherein at least one instruction in the patcher function of the rewriteable memory is an instruction that receives a function's unique identifier as a global variable to determine which patched function to execute and wherein the patcher function then jumps to a respective patched function in the second section of the rewritable memory.

* * * * *